United States Patent [19]
Cha

[11] Patent Number: 6,011,774
[45] Date of Patent: Jan. 4, 2000

[54] ORDER-WIRE SIGNAL HANDLING APPARATUS

[75] Inventor: Jae-Kyu Cha, Incheon, Rep. of Korea

[73] Assignee: Daewoo Telecom, Ltd., Incheon, Rep. of Korea

[21] Appl. No.: 08/774,839

[22] Filed: Dec. 27, 1996

[30] Foreign Application Priority Data

Dec. 30, 1995 [KR] Rep. of Korea ........................ 95-69193

[51] Int. Cl.$^7$ ............................ G01R 31/08; G06F 11/00; G08C 15/00; H04L 7/00
[52] U.S. Cl. ........................ 370/225; 370/225; 370/223; 370/505; 370/506; 375/106; 375/107
[58] Field of Search ..................................... 370/505, 506, 370/507, 508, 503, 516, 517, 222, 223, 535, 112, 217, 252, 522, 524, 536, 14, 15, 16; 375/107, 118, 106, 110

[56] References Cited

U.S. PATENT DOCUMENTS

| | | | |
|---|---|---|---|
| 4,727,541 | 2/1988 | Mori et al. ................................ 370/112 |
| 4,815,109 | 3/1989 | Kao ........................................ 375/107 |
| 5,278,824 | 1/1994 | Kremer ..................................... 370/15 |
| 5,790,520 | 8/1998 | Iwamoto et al. ......................... 370/223 |

*Primary Examiner*—Michael Horabik
*Assistant Examiner*—Man Phan
*Attorney, Agent, or Firm*—Pennie & Edmonds LLP

[57] ABSTRACT

An apparatus for processing an order-wire signal capable of providing a high quality communication between operators through an order-wire channel for use in a synchronous add drop multiplexer(ADM) including a multiplexing unit and a de-multiplexing unit comprises: mixer for mixing two signals to generate a mixed signal, one being a voice signal of an operator at the ADM, the other being an order-wire signal received from a de-multiplexing unit in the ADM; detector for detecting a slip to generate a control signal and generating slip data; and selector for selecting one out of the mixed signal and the received order-wire signal to produce a selected signal, and transmitting the selected signal to the multiplexing unit in the ADM.

5 Claims, 3 Drawing Sheets

ORDER-WIRE SIGNAL HANDLING APPARATUS

FIELD OF THE INVENTION

The present invention relates to an add drop multiplexer for use in a synchronous telecommunication network; and, more particularly, to an order-wire data processing apparatus in the add drop multiplexer capable of bypassing and reconstructing the order-wire data.

Description of the Prior Art

A mutiplexer is widely used in a transmission system for implementing a synchronous digital hierarchy(SDH) recommended by The International Telecommunication Union-Telecommunications Standardization Sector(ITU-T). The multiplexer in a telecommunication network may be operated in two different operation modes depending on the type of the configuration of the network: one as a terminal multiplexer(TM); and the other as an add drop multiplexer (ADM). The TM is employed at both ends of the network, while the ADM is located at a midway point, i.e., a node on the ring of telecommunication network and has a function of bypassing data therethrough in addition to multiplexing and de-multiplexing functions which are common to the TM and the ADM, wherein the bypassing function refers to an operation of the ADM letting an incoming signal pass by as it is when the ADM is not a destination of the incoming signal.

On the other hand, operators at each node need to communicate with each other for the operation and maintenance work of the network such as monitoring the status of the multiplexers, repairing faults in the multiplexers and the like. With a view to accommodating a communications path between operators, therefore, channels for order-wire signal, E1 and E2, are allocated within a synchronous transport module level 1(STM-1) frame, the basic signal of the SDH, wherein the order-wire channel is a voice or data channel between each node of the telecommunication network for exclusive usage by the operators. Accommodating communications between operators at separate nodes is one of the functions of the multiplexer.

Referring to FIG. 1, there is illustrated an exemplary telecommunication network including four identical ADM's. An ADM at a node A 110, for example, has a multiplexing unit(MUX) 111 and a de-multiplexing unit (DEMUX) 112 for performing multiplexing and de-multiplexing operation based on the SDH, two transmitting units, 114 and 116, for converting a multiplexed electric signal into an optical signal and transmitting the optical signal to a next ADM, and two receiving units, 113 and 115, for receiving an optical signal from the next ADM, converting the received signal into an electric signal and sending the converted signal to the DEMUX 112.

While a caller connected to the node A 110 is communicating with a receiver connected to a node C 130, a voice signal of the caller is inputted to a switching system(not shown) connected to the node A, and then, is multiplexed at the MUX 111 so that it can be incorporated in a payload within a STM-1 frame, wherein the payload is a part of the STM-1 frame in which signals carrying thousands of subscribers' voice data may be loaded. The STM-1 signal may be converted from an electrical signal to an optical signal to be transmitted via a fiber optic cable. The optically-converted STM-1 signal bypasses a node B 120 since the node B is not the destination of the signal, and then, arrives at the node C. The receiving unit 132 at the node C receives the STM-1 data and the DEMUX 131 de-multiplexes the STM-1 signal: that is, various overhead data attached to the STM-1 signal is peeled off the STM-1 signal and the STM-1 signal is broken into a plurality of signals, each bearing only one subscriber's voice data. Among the de-multiplexed signal, the caller's signal is extracted and converted into an analog signal and sent to the receiver's station through a switching system(not shown) connected to the node C. Communication between subscribers at nodes B and D is performed in the same manner as described in the above. Communication between subscribers at adjacent nodes is also performed in the same manner except that there is no bypassing involved.

However, the communications between operators at separate nodes differs from the communications between ordinary subscribers in a number of ways. First, for communications between operators, order-wire channels, E1 or E2, is used, wherein the channel E1 or E2 is part of the section overhead of the STM-1 frame segregated from the payload which carries subscriber data.

Second, since the order-wire channel serves only the operators, the operator's voice signal need not be multiplexed, whereas the signals for subscriber communications are multiplexed to make up the STM-1 signal to achieve an efficient transmission thereof.

Third, communications through the order-wire channel are handled not by a switching system(not shown) but by an apparatus incorporated in the multiplexer to be used exclusively for the order-wire communications.

A conventional ADM handles an order-wire signal in such a way that the order-wire signal from another node bypasses the ADM when an operator's telephone at the node having the ADM is in an on-hook condition, and on the other hand, when the operator's telephone is in an off-hook condition, i.e., when the operator is talking on the line, the order-wire signal from the other node passing through the ADM and the operator's speech signal may be synthesized to form a single synthesized signal in an analog form and then the synthesized signal is converted to digital data suitable to the E1 or E2 and sent to a destination multiplexer.

In the conventional ADM, however, the ADM is not provided with a function of detecting a slip, wherein the slip refers to a state that a system clock exceeds a predetermined tolerance range, wherein the system clock is made from the received clock and is used as a reference clock of its corresponding transmitted signal from the ADM at the node B 120. Therefore, the quality of a signal passing through the order-wire channel may degrade to a substandard level when the slip occurs in the transmitted signal.

SUMMARY OF THE INVENTION

It is, therefore, a primary object of the present invention to provide a high quality communication between operators through an order-wire channel.

In accordance with one aspect of the present invention, there is provided an apparatus for processing an order-wire signal for use in a synchronous add drop multiplexer(ADM) including a multiplexing unit and a de-multiplexing unit to thereby select a handling procedure of an order-wire signal, which comprises: mixing means for mixing two signals to generate a mixed signal, one being a voice signal of an operator at the ADM, the other being an order-wire signal received from a de-multiplexing unit in the ADM; detecting means for detecting a slip to generate a control signal and generating slip data, wherein the slip refers to a state in which a deviation in a system clock rate of the ADM exceeds a predetermined tolerance range, and the system clock is provided by using a signal received from another ADM and is used as a reference clock of its corresponding signal transmitted from the ADM; and selecting means for selecting one out of the mixed signal and the received order-wire signal to produce a selected signal, and transmitting the selected signal to the multiplexing unit in the ADM.

In accordance with another aspect of the present invention, there is provided a method for processing the order-wire signal for use in the synchronous add drop multiplexer(ADM) including the multiplexing unit and the de-multiplexing unit to thereby select the handling procedure of the order-wire signal, comprising the steps of: (a) bypassing and transmitting an order-wire signal received from the de-multiplexing unit as it is when a slip does not occur, wherein the slip refers to a state that a deviation in a system clock rate of the ADM exceeds a predetermined tolerance range, and the system clock is produced by using a synchronous signal received from another ADM and is used as a reference clock of its corresponding signal transmitted from the ADM; and (b) mixing two signals to generate a mixed signal, one of which is a voice signal of an operator at the ADM, the other of which is from a received order-wire signal received from a de-multiplexing unit in the ADM when the slip occurs and transmitting the mixed signal.

BRIEF DESCRIPTION OF THE DRAWINGS

The above and other objects and features of the present invention will become apparent from the following description of preferred embodiments given with reference to the accompanying drawings, in which.

DETAILED DESCRIPTION OF THE PREFERRED EMBODIMENTS

Figure 1:
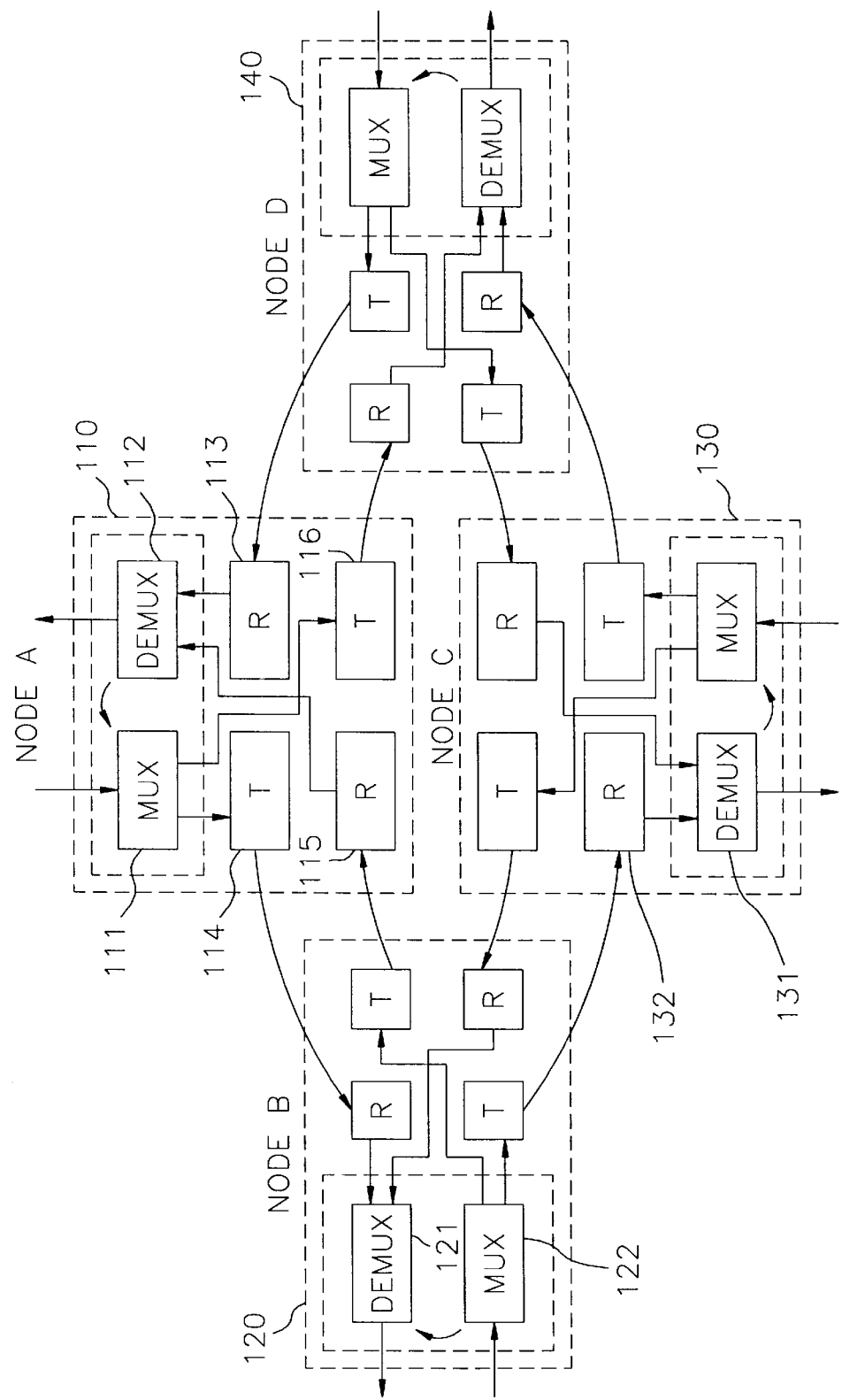
FIG. 1 illustrates an exemplary telecommunication network including add drop multiplexers.
Figure 2:
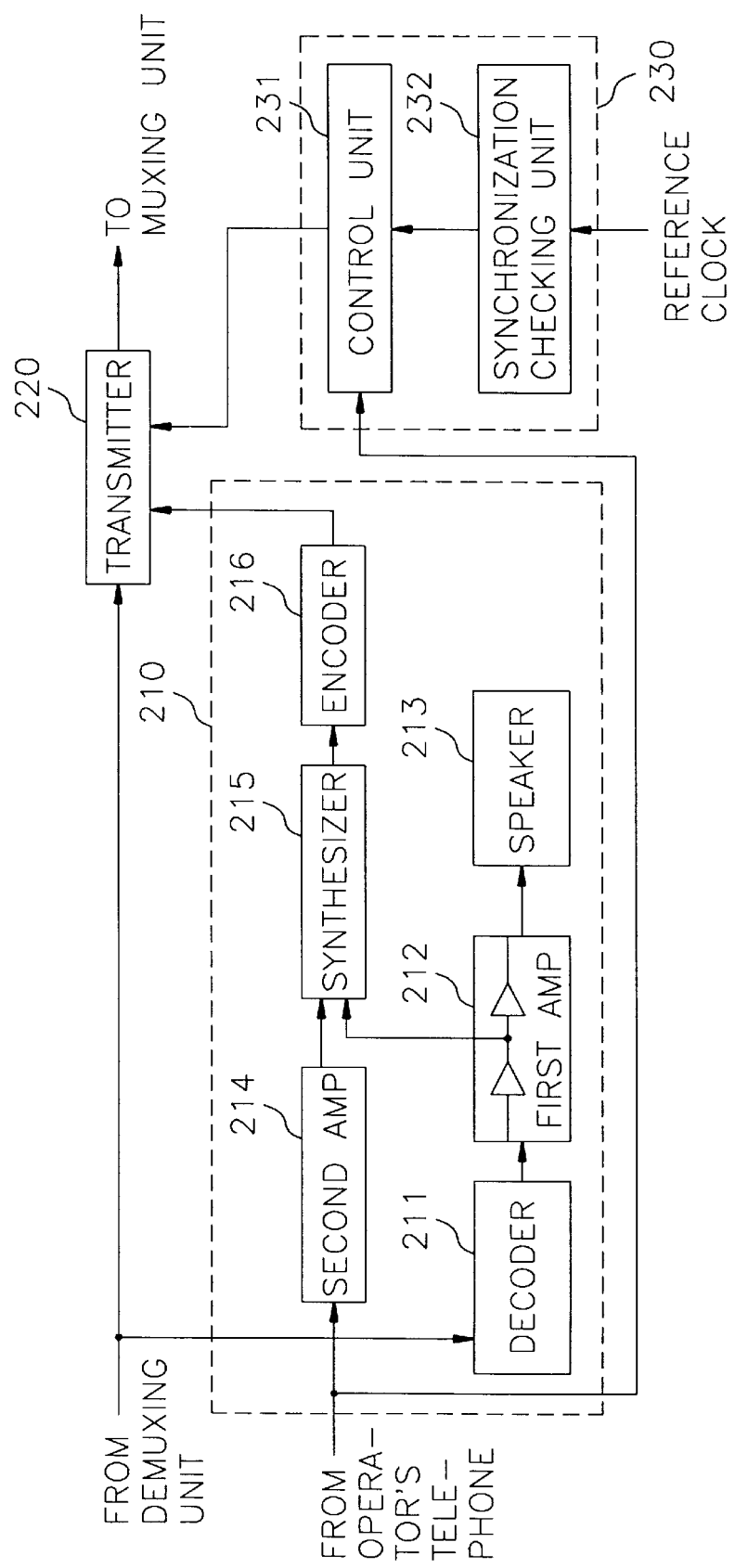
FIG. 2 presents an order-wire signal handling apparatus in accordance with the present invention.

In FIG. 2, there is illustrated an apparatus handling an order-wire signal for use in an add drop multiplexer(ADM) at each of the nodes 110 to 140 in FIG. 1 in accordance with the present invention.

In this embodiment, however, assuming that an operator at a node, e.g., a node A 110, communicates with another operator at another node, e.g., a node C 130, the order-wire signal is first transferred from the node A 110 to a node, e.g., a node B 120 and the illustration of the apparatus in accordance with the present invention is given based on the apparatus located at the node B hereinafter. As is shown in FIG. 2, the apparatus comprises three main blocks, a mixing block 210, a transmitter 220 and a control block 230. The mixing block 210 has a function of mixing two signals to generate a mixed signal: one of which is a voice signal of an operator at the ADM at the node B 120; the other of which is an order-wire signal received from a DEMUX 121, E1 or E2, which is extracted from a STM-1 frame received at the ADM at the node B 120. The transmitter 220 selects one out of two signals and sends it to the ADM at the node C 130. A control block 230 detects the slip and generates the control signal for use in the selection at the transmitter 220.

A decoder 211 in the mixing block 210 converts the order-wire signal into an analog signal to provide the analog signal to a first amplifier(AMP) 212, wherein the first AMP 212, including two serially connected electric amplifier, e.g., OP AMP's therein, amplifies the analog signal to feed different signal levels suitable both to a synthesizer 215 and to a speaker 213, respectively. The speaker 213 converts the signal from the first AMP 212 into an audible sound so that an operator at the node B 120 can hear the sound. A second AMP 214 is also an electric amplifier, e.g., the OP AMP for amplifying a voice signal of the operator at the node B to produce a signal to be synthesized at a synthesizer 215. The synthesizer 215 is for electrically adding two signals, e.g., signals from the first and the second AMP, 212 and 214, respectively, and an encoder 216 converts the analog signal synthesized at the synthesizer 215 into a reconstructed signal to be transmitted on the E1 or E2 in the STM-1 frame and provides the digital signal to the transmitter 220 as a reconstructed signal. The transmitter 220 selects either the signal received directly from the node A or the reconstructed signal from the mixing block 210 in response to the control signal from the control block 230, and transmits the selected signal to the MUX 122 of the ADM at the node B and finally to a destination node, e.g., the node C 130. A control unit 231 detects an on/off-hook state of the telephone of the operator at the node B 120, receives a checking result from a synchronization checking unit 232 to generate the control signal to be sent to the transmitter 220 for use in the selection. The synchronization checking unit 232 is for extracting a reference clock from the received signal and producing a system clock using the received signal to check whether or not a slip falls within a predetermined tolerance range, wherein the system clock is made from the received clock and is used as a reference clock of its corresponding transmitted signal from the ADM at the node B 120.

In case the operator's telephone at the node B is in off-hook condition while the operators at the node A and C is communicating, in order to send signal including the voice signal of the operator at the node B to the destination node C, the transmitter 220 selects the reconstructed signal in response to the control signal in which the voice signal of the operator at the node B is synthesized with the voice signal from the node A 110. On the other hand, when the operator's telephone at the node B is in on-hook condition, on the contrary to the conventional ADM wherein the incoming order-wire signal bypasses the ADM, at the ADM with the apparatus in accordance with the present invention, it is checked whether or not the slip occurs, since the slip may cause a data error in the stage of receiving the order-wire signal at the destination node C, thus finally entail a severe damage on the communication quality. In determining the slip, if the system clock is within the predetermined tolerance range, the signal from the node A 110 is selected at the transmitter 220 to be sent to the MUX 122 of the ADM at the node B 120 and finally to the node C 130. Otherwise, the received signal is put through the reconstruction process performed in the mixing block 210 and then the reconstructed signal is sent to the MUX 122 of the ADM at the node B 120 and finally the node C 130 through the transmitter 220.

Figure 3:
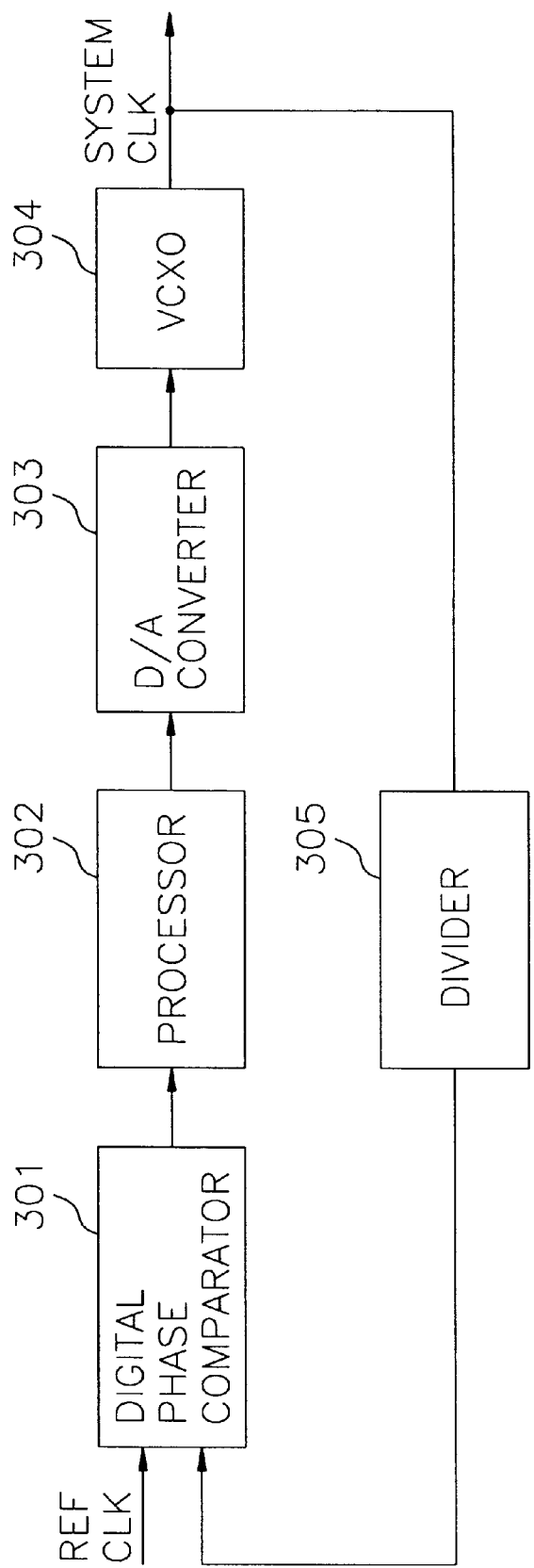
FIG. 3 shows details of a synchronization checking unit in FIG. 2.

The synchronization checking unit 232 of FIG. 2 is illustrated in detail in FIG. 3. The reference clock being extracted from the STM-1 signal received at the node B 120 and being divided into 8 kbps is fed to a digital phase comparator 301 to be compared with a digital signal from a divider 305. A phase difference data from the digital phase comparator 301 is inputted to a processor 302 wherein the phase difference data is accumulated for a designated duration and averaged to be used as a digital control data. The control data is fed to a D/A converter 303, wherein the digital control data is converted into an analog voltage signal. The analog voltage signal is inputted to a voltage controlled crystal oscillator(VCXO) 304 to produce the system clock. The system clock is fed to the divider 305 wherein the system clock is divided into an 8 kbps clock. The 8 kbps clock is fed back to the digital phase comparator 301 so that the system clock can track the reference clock. As used herein, the system clock is used for determining whether the slip occurs or not. If a variation of the system clock rate exceeds the predetermined tolerance range, the slip is detected.

Consequently, the order-wire signal handling apparatus for use in the ADM in accordance with the present invention is capable of enhancing a communication quality through the order-wire channel by reconstructing the received order-wire signal at a node in the midway of the order-wire signal when the slip occurs.

While the present invention has been described with respect to the preferred embodiments, other modifications and variations may be made without departing from the scope and spirit of the present invention as set forth in the following claims.

What is claimed is:

1. An apparatus for processing an order-wire signal for use in a synchronous add drop multiplexer (ADM), including a multiplexing unit and de-multiplexing unit to thereby select a handling procedure of the order-wire signal, which comprises:

mixing means for mixing two signals to generate a mixed signal, one being a voice signal of an operator at the ADM, the other being an order-wire signal received from a de-multiplexing unit in the ADM;

detecting means for detecting a slip to generate a control signal and generating slip data, wherein the slip refers to a state in which a deviation in a system clock rate of the ADM exceeds a predetermined tolerance range, and the system clock is provided by using a signal received from another ADM and is used as a reference clock of its corresponding signal transmitted from the ADM; and selecting means for selecting one out of the mixed signal and the received order-wire signal to produce a selected signal, and transmitting the selected signal to the multiplexing unit in the ADM, wherein the mixing means includes:

means for decoding the order-wire signal to generate a decoded signal, wherein the decoding refers to an operation of converting the order-wire signal into its corresponding analog signal;

first amplifying means for amplifying the decoded signal;

second amplifying means for amplifying the voice signal;

means for synthesizing signals from the first and the second amplifying means to generate a synthesized signal; and means for encoding the synthesized signal to generate an encoded signal, wherein the encoding refers to an operation of converting the synthesized signal into its corresponding digital signal.

2. The apparatus of claim 1, which further comprises a speaker for converting a signal from the first amplifying means into an audible sound.

3. The apparatus of claim 2, wherein the first amplifying means includes two serially connected amplifiers, an A amplifier and a B amplifier, and wherein the output of the A amplifier is fed to the synthesizing means and the output of the B amplifier is fed to the speaker.

4. A method for processing an order-wire signal for use in a synchronous add drop multiplexer(ADM) including a multiplexing unit and a de-multiplexing unit to thereby select a handling procedure of the order-wire signal, comprising the steps of:

(a) bypassing and transmitting an order-wire signal received from the de-multiplexing unit as it is when a slip does not occur, wherein the slip refers to a state that a deviation in a system clock rate of the ADM exceeds a predetermined tolerance range, and the system clock is produced by using a synchronous signal received from another ADM and is used as a reference clock of its corresponding signal transmitted from the ADM; and (b) mixing two signals to generate a mixed signal, one of which is a voice signal of an operator at the ADM, the other of which is from a received order-wire signal received from a de-multiplexing unit in the ADM when the slip occurs and transmitting the mixed signal.

5. A synchronous add drop multiplexer implementing therein a method recited in claim 4.

* * * * *